Dec. 25, 1956

R. HAGEN ET AL 2,774,993

PROCESS FOR MAKING GRIPS FOR HANDLES
OF PLIERS AND SIMILAR HANDLES

Filed Dec. 30, 1952

INVENTORS
Reinold Hagen, Norbert Hagen
BY

Dec. 25, 1956  R. HAGEN ET AL  2,774,993
PROCESS FOR MAKING GRIPS FOR HANDLES
OF PLIERS AND SIMILAR HANDLES
Filed Dec. 30, 1952  2 Sheets-Sheet 2

INVENTORS
Reinold Hagen, Norbert Hagen
BY

United States Patent Office 2,774,993
Patented Dec. 25, 1956

2,774,993

PROCESS FOR MAKING GRIPS FOR HANDLES OF PLIERS AND SIMILAR HANDLES

Reinold Hagen, Hangelar Ueber Siegburg, Rhineland, and Norbert Hagen, Siegburg, Rhineland, Germany Application December 30, 1952, Serial No. 328,558

2 Claims. (Cl. 18—59)

This invention relates to a process for the manufacture of grips of thermoplastic material for handles of pliers and other tools, bicycle handlebars, etc. and is especially concerned with grips of insulating properties. More particularly, the invention deals with a process for covering handles of the kind referred to with grips. Finally, it deals with an apparatus for manufacturing such grips and with the grips themselves.

It has already been suggested to produce bottles or similar hollow bodies from thermoplastic materials by closing a split mold over a section of a tube as the tube leaves an extrusion press, thereby cutting off that section and sealing it at both ends. A hollow needle was then introduced through the wall of the bottle neck to blow compressed air through the needle until the tubular section expanded to fit the walls of the mold cavity. Such bottles, however, have no shrinking properties.

Our present invention aims at important developments of such known methods. All of the objects of our invention will become apparent from the following description.

The specification is accompanied by a drawing in which—

Figure 1:
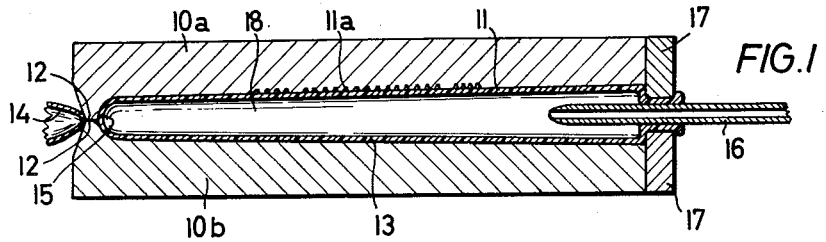
Fig. 1 is a section through a mold producing the first step product in the manufacture of the grips of the invention from tubing as the latter leaves an extrusion die.

Referring to the drawing, and initially to Fig. 1, the mold shown consists of two halves 10a and 10b which, with the mold in closed position, enclose a cavity 11, the internal diameter of which is smaller than the external diameter of the object to be covered by our grips. The mold shown may be used, for instance, for the manufacture of handles for combination pliers and many other tools. The cavity defining wall of the mold is shaped, as at 11a, to make desired surface impressions on the grip being produced. The two mold halves 10a and 10b are provided at their rear ends with transversely extending cutting edges 12 which are spacedly effective when the mold is shut. In this way, the tubular section 13 which has previously been fed between the mold halves is cut off from the tube 14 coming from the extrusion press, and at the same time, the section 13 is closed at its rear end at 15.

While feeding the tubing 13, 14, upon leaving the extrusion press, into the mold shown in Fig. 1, the front end is slipped over the nozzle 16. When the mold is closed, the free end of the section 13 is tightly pressed around the outside of the nozzle 16 by clamping jaws 17. The cavity 18 within the tube section 13 is thus hermetically sealed. When a blow of compressed air is admitted through the nozzle 16 after the mold has been closed or while the mold is being closed, the section 13 expands until it fits tightly against the walls of the mold halves 10a and 10b.

Figure 2:
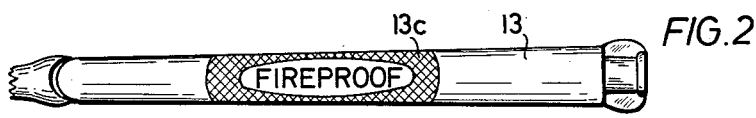
Fig. 2 shows the first step product.

The step product 13 which is produced in the manner just described is shown in Fig. 2. It is provided with surface impressions 13c which correspond negatively to the mold impressions 11a, and is now transferred to a split mold according to Fig. 3. There, it first assumes the dash-dotted line position 13a. Prior to this transfer, the step produce 13 has been allowed to cool, and has been heated to a temperature above its softening point but below its flow point. Now, compressed air is again admitted, so that the tube 13 assumes the shape 13b which is determined by the configuration of the inner walls 19 of the mold halves 20a and 20b. This mold is not heated. The tube section is, thus, cooled in the mold. Upon cooling, it loses its shrinking quality and retains instead its expanded shape 13b when it is withdrawn from the mold 20a, 20b.

After the head portion 13c has been severed, the expanded tube can be slipped over the handle to be covered and can be shrunk by heat treatment.

Figure 3:
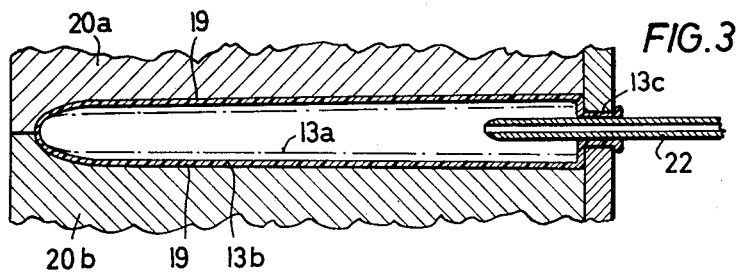
Fig. 3 is a section through a mold in which another shape and shrinking properties are given to the said step product.
Figure 4:
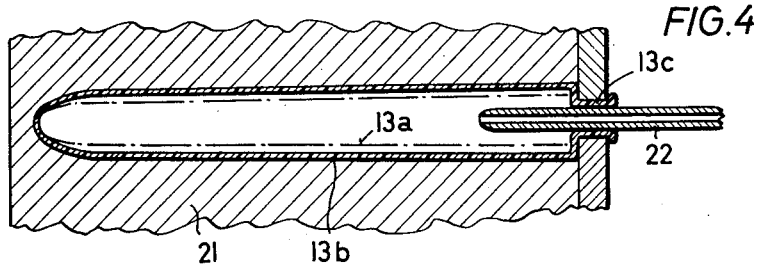
Fig. 4 is a section through a modified mold serving the same purpose as the mold shown in Fig. 3.

Fig. 4 shows a one-piece mold 21 in which the step product 13a is blown up until it assumes the shape 13b. The further treatment after the use of the mold 21 is the same as the one described in connection with Fig. 3.

The nozzle 16 which served to admit air into the mold 10a, 10b of Fig. 1 may be left in the step product 13 to be transferred with the step product to the second mold shown in Fig. 3 or Fig. 4. However, it is also possible to provide for another nozzle 22 in the second mold instead of transferring the nozzle 16. There is no difficulty in introducing the nozzle 22 into the narrow end 13c so as to produce a tight seal.

The molds of Figs. 3 and 4 may also be constructed to hold simultaneously a multiplicity of tubular sections.

Figure 5:
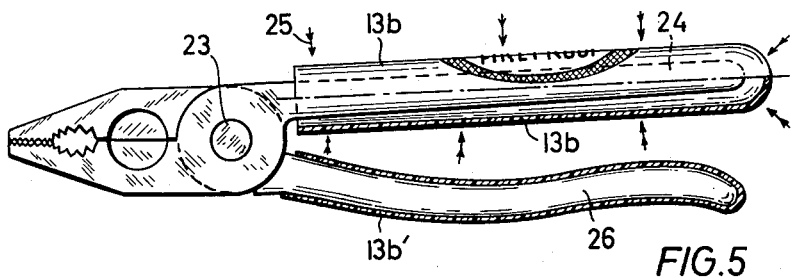
Fig. 5 shows pliers with a grip, in an intermediate stage of its application, loosely slipped over one of the plier handles and a grip, in its final stage, tightly fitting on the other handle.

In Fig. 5, the step product 13b appears slipped over the handle 24 of electricians' pliers 23. Upon heating the step product 13b, while on the handle 24, the grip shrinks from the shape 13b to the shape 13b', a grip of the latter shape being shown on the plier handle 26. The shrinking takes place in the direction of the double arrows 25. When shrunk, the grip fits tightly on the handles and is sure not to slip.

Figure 6:
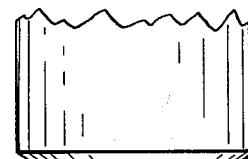
Fig. 6 is explanatory of the extrusion of tubing into the open space of the mold shown in Fig. 1.

Fig. 6 illustrates the step of extruding the open-ended tubing 14 into the open space of the two-part mold 10a, 10b shown in Fig. 1.

Many thermoplastics are suitable for our purpose. We have used polyvinyl chloride most advantageously.

It is believed that the method of our invention, as well as the construction and operation of the forms of apparatus for practicing the invention, and the many advantages thereof, will be understood from the foregoing detailed description.

It will be clear that according to our invention, a tube of an internal diameter smaller than the outer diameter of the object to be covered is extruded from a die in a known manner and that a section of the tube is introduced in a sectional mold, whereby the closing mold sections cut off that tube section and close one end of the tube section, whereas the other end which has been pushed over a nozzle is tightly clamped around the nozzle by the mold sections of other mold parts. While the temperature of the tube section is still above the flow temperature of the material used, compressed air or gas or any other fluid under pressure is introduced through the nozzle and expands the tubular section until it lies closely against the inner walls of the mold cavity. Upon opening of the split mold, the tubular section is withdrawn, allowed to cool, reheated, and introduced into a second mold which is wider than the object to be covered by the grip. In this mold, the tubular section is expanded at a temperature below the flow temperature. In this expanded state, the tube section is cooled below its softening temperature to temporarily arrest its shrinking properties. In its expanded shape, it is taken from the second mold and may now be slipped, for instance, over the handle of a pair of pliers, whereupon by reheating the shrinking qualities are revived so that the grip will closely surround the handle.

The first mold by means of which the tube section is cut off and in which the tube section is expanded at a temperature above the flow temperature is preferably engraved with lettering, ornaments, etc. The replicas of such engravings on the outside of the grips are preserved even if a smooth-walled mold is used for the second expansion step of the process of our invention.

It will be apparent that while we have shown and described our invention partly in one form and partly in two forms only, many changes and modifications may be made without departing from the spirit of the invention claimed in the following claims.

We claim:

1. Process for covering handles of pliers and other tools, bicycle handlebars, etc. with grips of thermoplastic material, comprising the steps of extruding tubing, feeding same into a sectional mold, closing the mold, thereby pinching off the tube section in the mold from the rest of the tubing and closing the rear end of said tube section, expanding the tube section, while still above the flow point, by interiorly applied pressure to a diameter smaller than that of the handle to be covered, withdrawing the raw grip, allowing the same to cool, reheating same to a temperature to the softening point and below the flow point, introducing the raw grip into another mold, expanding said grip to a diameter greater than that of the handle, cooling the raw grip within said other mold to a temperature below the softening point of the material used, withdrawing the cooled expanded grip from the mold, slipping same over the handle, heating the grip above the softening point, and allowing the grip to shrink to a tight fit.

2. The process according to claim 1, which includes providing lettering, ornaments, etc. on the outside of the grip by carrying out the first named expansion in a mold having its inner walls negatively shaped to the desired surface impressions.

References Cited in the file of this patent

UNITED STATES PATENTS

| 1,052,081 | Miltner | Feb. 4, 1913 |
| 1,998,356 | Brown | Apr. 16, 1935 |
| 2,003,707 | De Witt | June 4, 1935 |
| 2,027,962 | Currie | Jan. 14, 1936 |
| 2,236,552 | Ushakoff | Apr. 1, 1941 |
| 2,262,612 | Kopitke | Nov. 11, 1941 |
| 2,515,093 | Mills | July 11, 1950 |
| 2,579,399 | Ruckberg | Dec. 18, 1951 |
| 2,601,700 | Pinsky et al. | July 1, 1952 |